(12) United States Patent
Sturm et al.

(10) Patent No.: US 12,115,965 B2
(45) Date of Patent: Oct. 15, 2024

(54) VEHICLE WITH ANTILOCK BRAKING SYSTEM

(71) Applicant: Komatsu America Corp., Chicago, IL (US)

(72) Inventors: Nick Sturm, Peoria, IL (US); Yong Deng, Peoria, IL (US); Kory Leesman, Peoria, IL (US); Joshua Rohman, Peoria, IL (US); John Osborne, Peoria, IL (US)

(73) Assignee: Komatsu America Corp., Chicago, IL (US)

( * ) Notice: Subject to any disclaimer, the term of this patent is extended or adjusted under 35 U.S.C. 154(b) by 333 days.

(21) Appl. No.: 17/590,900

(22) Filed: Feb. 2, 2022

(65) Prior Publication Data

US 2022/0314956 A1    Oct. 6, 2022

Related U.S. Application Data

(60) Provisional application No. 63/167,735, filed on Mar. 30, 2021.

(51) Int. Cl.
*B60T 8/176* (2006.01)
*B60W 10/04* (2006.01)
(Continued)

(52) U.S. Cl.
CPC ........... *B60W 10/184* (2013.01); *B60T 8/176* (2013.01); *B60W 10/04* (2013.01); *B60W 10/196* (2013.01)

(58) Field of Classification Search
CPC .. B60W 10/184; B60W 10/04; B60W 10/196; B60W 2300/17; B60T 8/176; B60T 8/1766; Y02T 10/72
(Continued)

(56) References Cited

U.S. PATENT DOCUMENTS 4,477,124 A    10/1984    Watanabe
5,198,982 A    3/1993    Kobayashi
(Continued)

FOREIGN PATENT DOCUMENTS

CN    105966221 A    *    9/2016
CN    105984278 A    *    10/2016
(Continued)

OTHER PUBLICATIONS

Japanese Office Action regarding Patent Application No. 2022040105, dated Jun. 27, 2023.
(Continued)

*Primary Examiner* — B M M Hannan
(74) *Attorney, Agent, or Firm* — Harness, Dickey & Pierce, P.L.C.

(57) ABSTRACT

A heavy-duty vehicle includes a chassis, a wheel supporting the chassis, a drive system, a service brake, a drive system controller, and a service brake controller. The drive system includes a motor associated with the wheel. The motor is configured to propel the wheel and to apply a dynamic brake torque to the wheel. The service brake is associated with the wheel and configured to apply a service brake torque to the wheel. The drive system controller controls operation of the motor. The drive system controller selectively modulates the dynamic brake torque to the wheel based on traction conditions. The service brake controller controls operation of the service brake. The service brake controller may selectively modulate the service brake torque to the wheel based on the traction conditions. Modulation of the dynamic brake torque may be disabled during modulation of the service brake torque.

19 Claims, 5 Drawing Sheets

(51) Int. Cl.
*B60W 10/184* (2012.01)
*B60W 10/196* (2012.01)

(58) Field of Classification Search
USPC .......................................................... 701/48
See application file for complete search history.

(56) References Cited

U.S. PATENT DOCUMENTS

| | | | |
|---|---|---|---|
| 5,484,044 A | 1/1996 | Bursteinas et al. | |
| 5,615,933 A | 4/1997 | Kidston et al. | |
| 5,941,614 A | 8/1999 | Gallery et al. | |
| 6,017,101 A | 1/2000 | Matsuda | |
| 6,299,263 B1 | 10/2001 | Uematsu et al. | |
| 6,356,832 B1 | 3/2002 | Gamberg | |
| 6,456,922 B1 | 9/2002 | Gamberg | |
| 6,692,090 B1 | 2/2004 | Heyn et al. | |
| 8,014,927 B2 | 9/2011 | Uematsu | |
| 10,358,037 B2 | 7/2019 | Ueno | |
| 2009/0138169 A1* | 5/2009 | Uematsu | B60T 8/176 701/93 |
| 2010/0250083 A1 | 9/2010 | Takahashi et al. | |
| 2011/0257851 A1* | 10/2011 | Uematsu | B60W 10/184 701/50 |
| 2014/0257664 A1 | 9/2014 | Arbitmann et al. | |
| 2014/0324316 A1* | 10/2014 | Yao | B60T 13/585 701/70 |
| 2016/0272176 A1 | 9/2016 | Furuyama | |
| 2017/0015322 A1* | 1/2017 | Saito | B60W 60/0025 |
| 2018/0029577 A1* | 2/2018 | Beauvais | B60T 8/176 |
| 2018/0093571 A1 | 4/2018 | Hall et al. | |
| 2023/0068987 A1* | 3/2023 | Laine | B60L 3/102 |

FOREIGN PATENT DOCUMENTS

| | | | | |
|---|---|---|---|---|
| CN | 112406826 A | * | 2/2021 | ............ B60T 13/686 |
| EP | 3381774 B1 | * | 10/2021 | ......... B60G 17/0164 |
| JP | H10322803 A | | 12/1998 | |
| JP | 2015093571 A | | 5/2015 | |
| JP | 2017109552 A | | 6/2017 | |
| JP | 2020006921 A | | 1/2020 | |
| JP | 2022026826 A | * | 2/2022 | |
| WO | WO-2014045825 A1 | * | 3/2014 | .............. B60L 1/003 |
| WO | WO-2021144009 A1 | * | 7/2021 | .......... B60L 15/2036 |
| WO | WO-2022254891 A1 | * | 12/2022 | |

OTHER PUBLICATIONS

Canadian Office Action regarding Application No. 3151708 dated Mar. 31, 2023.
Komatsu *980E-5 Electric Drive Truck*; dated Jul. 2019; 16 pages; USA.
Canadian Office Action regarding Application No. 3,151,708, mailed Nov. 23, 2023.
Notice of Reasons for Rejection regarding Japanese Application No. 2022-040105, dated Dec. 26, 2023.

* cited by examiner

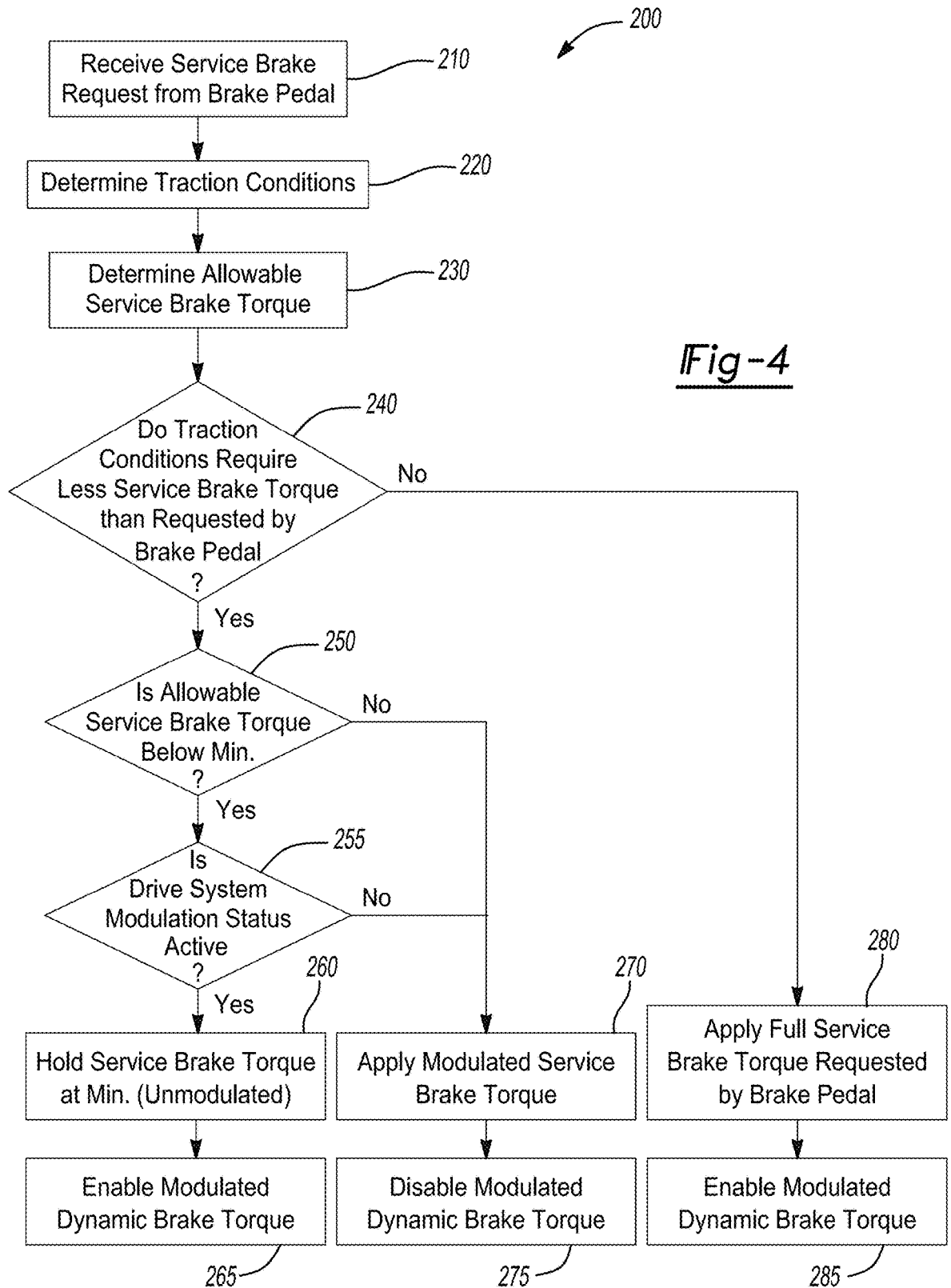

VEHICLE WITH ANTILOCK BRAKING SYSTEM

CROSS-REFERENCE TO RELATED APPLICATIONS

This application claims the benefit of U.S. Provisional Application No. 63/167,735, filed on Mar. 30, 2021. The entire disclosure of the above application is incorporated herein by reference.

FIELD

The present disclosure relates to a vehicle (e.g., a heavy-duty vehicle) with an antilock braking system.

BACKGROUND

This section provides background information related to the present disclosure and is not necessarily prior art.

Heavy-duty vehicles, such as large, off-highway dump trucks (e.g., articulated trucks, underground haulage trucks, etc.), can lose traction in slippery and/or high rolling-resistance conditions (e.g., snowy, icy, muddy, wet, sandy, gravelly, and/or oily conditions). Hard, sudden braking in such conditions can result in one or more wheels locking up, which can cause the vehicle to slide and increases the braking time and distance.

Heavy-duty vehicles can include an electric drive system that can function to propel the vehicle and brake the vehicle. These vehicles also include hydraulic service brakes that supplement the retarding function of the drive system. The present disclosure provides a system that controls application of the service brakes and drive-system braking in a manner that maintains vehicle traction, reduces or eliminates wheel lockup, and reduces stopping distance and time.

SUMMARY

This section provides a general summary of the disclosure, and is not a comprehensive disclosure of its full scope or all of its features.

In one form, the present disclosure provides a vehicle (e.g., a heavy-duty vehicle) that includes a chassis, a wheel supporting the chassis, a drive system, a service brake, a drive system controller, and a service brake controller. The drive system includes a motor associated with the wheel. The motor is configured to propel the wheel and to apply a dynamic brake torque to the wheel. The service brake is associated with the wheel and configured to apply a service brake torque to the wheel. The drive system controller is configured to control operation of the motor. The drive system controller selectively modulates the dynamic brake torque to the wheel based on traction conditions. The service brake controller is configured to control operation of the service brake. The service brake controller may selectively modulate the service brake torque to the wheel based on the traction conditions. Modulation of the dynamic brake torque is disabled during modulation of the service brake torque. For example, the service brake controller may disable modulation of the dynamic brake torque during modulation of the service brake torque.

In some configurations of the vehicle of the above paragraph, the service brake controller determines an allowable service brake torque based on traction conditions. The service brake controller is configured to hold the service brake torque at an unmodulated minimum torque when the allowable service brake torque is less than a predetermined minimum.

In some configurations of the vehicle of either of the above paragraphs, the service brake controller allows modulation of dynamic brake torque while the service brake torque is held at the unmodulated minimum torque.

In some configurations of the vehicle of any of the above paragraphs, the service brake controller determines an allowable service brake torque based on traction conditions. The service brake controller is configured to modulate the service brake torque when: (a) the allowable service brake torque is less than a service brake torque requested by a brake signal (e.g., from a brake pedal), and (b) the allowable service brake torque is greater than a predetermined minimum.

In some configurations of the vehicle of any of the above paragraphs, the service brake controller communicates a disable command to the drive system controller to disable modulation of the dynamic brake torque during modulation of the service brake torque.

In some configurations of the vehicle of any of the above paragraphs, the service brake and the motor of the drive system are operable in a first state, a second state, and a third state. In the first state, the service brake controller and the drive system controller apply unmodulated service brake torque and unmodulated dynamic brake torque when traction conditions do not require less brake torque than an amount of brake torque requested by a brake signal (e.g., from a brake pedal). In the second state, the service brake controller holds the service brake torque at an unmodulated minimum torque and the drive system controller applies modulated dynamic brake torque. In the third state, the service brake controller applies modulated service brake torque and the drive system controller applies unmodulated dynamic brake torque.

In some configurations of the vehicle of any of the above paragraphs, the vehicle includes a combination brake pedal in communication with the drive system controller and the service brake controller. When the brake pedal is depressed a first distance, the drive system controller causes the motor to apply the dynamic brake torque to the wheel. When the brake pedal is depressed a second distance that is greater than the first distance, the service brake controller causes the service brake to apply the service brake torque to the wheel.

In some configurations of the vehicle of any of the above paragraphs, the vehicle includes an additional wheel supporting the chassis, and an additional service brake associated with the additional wheel and configured to apply a service brake torque to the additional wheel. The drive system includes an additional motor associated with the additional wheel. The additional motor is configured to propel the additional wheel and to apply a dynamic brake torque to the additional wheel.

In some configurations of the vehicle of the above paragraph, the service brakes are operable independently of each other, and the motors are operable independently of each other.

In some configurations of the vehicle of any of the above paragraphs, the service brake is a hydraulically actuated disc brake.

In some configurations of the vehicle of any of the above paragraphs, the drive system controller and the service brake controller are configured to apply the dynamic brake torque and the service brake torque, respectively, in response to one or more brake signals.

In another form, the present disclosure provides a method that may include receiving a brake request from a brake pedal of the vehicle; determining traction conditions between a wheel of the vehicle and a ground surface; determining a maximum allowable brake torque based on the traction conditions; applying dynamic brake torque to the wheel using a motor of a drive system of the vehicle, wherein the motor is operable to propel the vehicle and is operable to brake the vehicle; applying a service brake torque to the wheel using a service brake, wherein the service brake is operable independently of the motor; selectively switching the dynamic brake torque between modulated and unmodulated dynamic brake torque; selectively switching the service brake torque between modulated and unmodulated service brake torque; and disabling modulated dynamic brake torque to the wheel while modulated service brake torque is applied to the wheel.

In some configurations of the method of the above paragraph, the method includes determining an allowable service brake torque based on the traction conditions; and holding the service brake torque at an unmodulated minimum torque in when the allowable service brake torque is less than a predetermined minimum.

In some configurations of the method of either of the above paragraphs, the method includes modulating dynamic brake torque while the service brake torque is held at the unmodulated minimum torque.

In some configurations of the method of any of the above paragraphs, the method includes determining an allowable service brake torque based on the traction conditions; and modulating the service brake torque when: (a) the allowable service brake torque is less than a service brake torque requested by the brake pedal, and (b) the allowable service brake torque is greater than a predetermined minimum.

In some configurations of the method of any of the above paragraphs, the method includes generating a disable command to disable modulation of the dynamic brake torque during modulation of the service brake torque.

In some configurations of the method of any of the above paragraphs, the service brake and the motor of the drive system are operable in a first state, a second state, and a third state. In the first state, unmodulated service brake torque and unmodulated dynamic brake torque are applied when traction conditions do not require less brake torque than an amount of brake torque requested by the brake pedal. In the second state, the service brake torque is held at an unmodulated minimum torque and the dynamic brake torque is modulated. In the third state, service brake torque is modulated and dynamic brake torque is unmodulated.

In some configurations of the method of any of the above paragraphs, the brake pedal is a combination brake pedal. When the brake pedal is depressed a first distance, the motor applies the dynamic brake torque to the wheel. When the brake pedal is depressed a second distance that is greater than the first distance, the service brake applies the service brake torque to the wheel.

In some configurations of the method of any of the above paragraphs, the vehicle includes an additional wheel; an additional service brake associated with the additional wheel and configured to apply a service brake torque to the additional wheel; and an additional motor associated with the additional wheel. The additional motor is configured to propel the additional wheel and to apply a dynamic brake torque to the additional wheel.

In some configurations of the method of the above paragraph, the service brakes are operable independently of each other, and the motors are operable independently of each other.

In some configurations of the method of any of the above paragraphs, the service brake is a hydraulically actuated disc brake.

In another form, the present disclosure provides a heavy-duty vehicle that may include a chassis, a wheel supporting the chassis, a motor, a service brake, and a controller. The motor is associated with the wheel and is configured to propel the wheel and to apply a dynamic brake torque to the wheel. The service brake is associated with the wheel and is configured to apply a service brake torque to the wheel. The controller is configured to control operation of the motor and operation of the service brake. In response to receipt of one or more braking signals, the controller selectively modulates the dynamic brake torque to the wheel based on traction conditions and selectively modulates the service brake torque to the wheel based on the traction conditions. The controller may disable modulation of the dynamic brake torque during modulation of the service brake torque.

In some configurations of the vehicle of the above paragraph, the controller determines an allowable service brake torque based on traction conditions. The controller is configured to hold the service brake torque at an unmodulated minimum torque when the allowable service brake torque is less than a predetermined minimum.

In some configurations of the vehicle of either of the above paragraphs, the controller allows modulation of dynamic brake torque while the service brake torque is held at the unmodulated minimum torque.

In some configurations of the vehicle of any of the above paragraphs, the controller determines an allowable service brake torque based on traction conditions. The controller may be configured to modulate the service brake torque when: (a) the allowable service brake torque is less than a service brake torque requested by a brake signal, and (b) the allowable service brake torque is greater than a predetermined minimum.

In some configurations of the vehicle of any of the above paragraphs, the service brake and the motor are operable in a first state, a second state, and a third state. In the first state, the controller applies unmodulated service brake torque and unmodulated dynamic brake torque when traction conditions do not require less brake torque than an amount of brake torque requested by a brake pedal. In the second state, the controller holds the service brake torque at an unmodulated minimum torque and applies modulated dynamic brake torque. In the third state, the controller applies modulated service brake torque and applies unmodulated dynamic brake torque.

In some configurations, the vehicle of any of the above paragraphs includes a combination brake pedal in communication with the controller. When the brake pedal is depressed a first distance, the controller causes the motor to apply the dynamic brake torque to the wheel. When the brake pedal is depressed a second distance that is greater than the first distance, the controller causes the service brake to apply the service brake torque to the wheel.

In some configurations, the vehicle of any of the above paragraphs includes: an additional wheel supporting the chassis; an additional service brake associated with the additional wheel and configured to apply a service brake torque to the additional wheel; and an additional motor associated with the additional wheel. The additional motor is configured to propel the additional wheel and to apply a dynamic brake torque to the additional wheel.

In some configurations of the vehicle of the above paragraph, the service brakes are operable independently of each other, and wherein the motors are operable independently of each other.

In some configurations of the vehicle of any of the above paragraphs, the service brake is a hydraulically actuated disc brake.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 4 is a flowchart depicting a process of controlling a service brake system of the vehicle;

Corresponding reference numerals indicate corresponding parts throughout the several views of the drawings.

DETAILED DESCRIPTION

Figure 1:
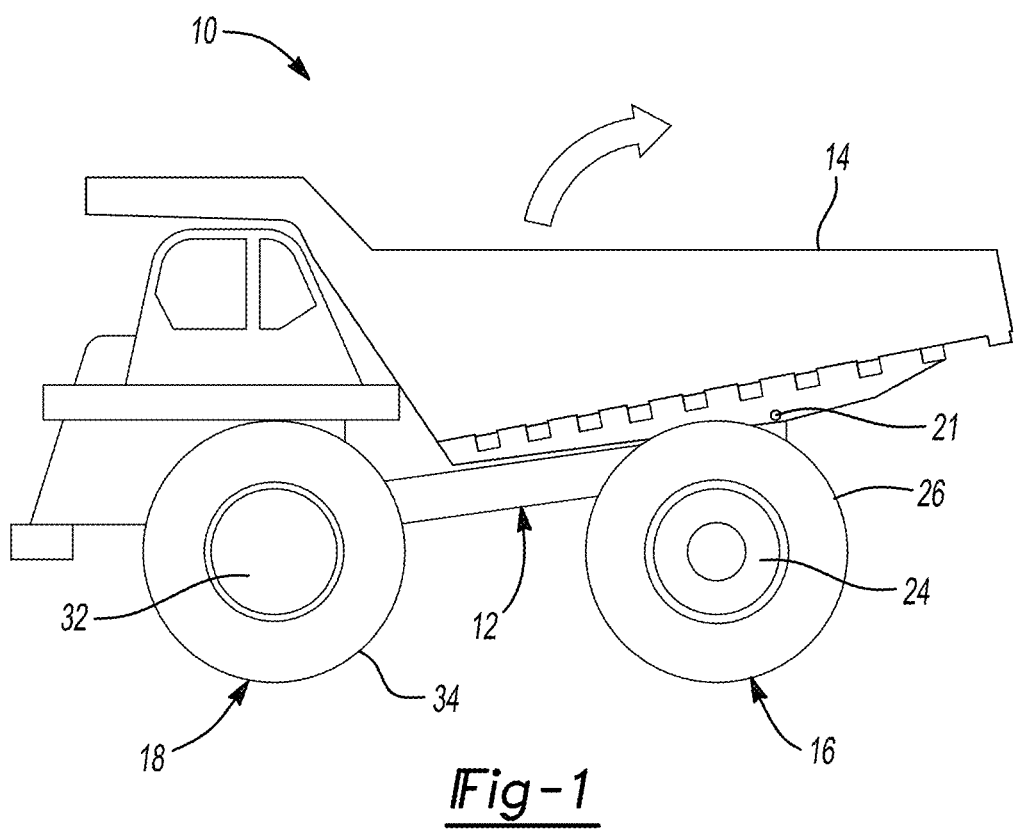
FIG. 1 is a schematic side view of a heavy-duty vehicle according to the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
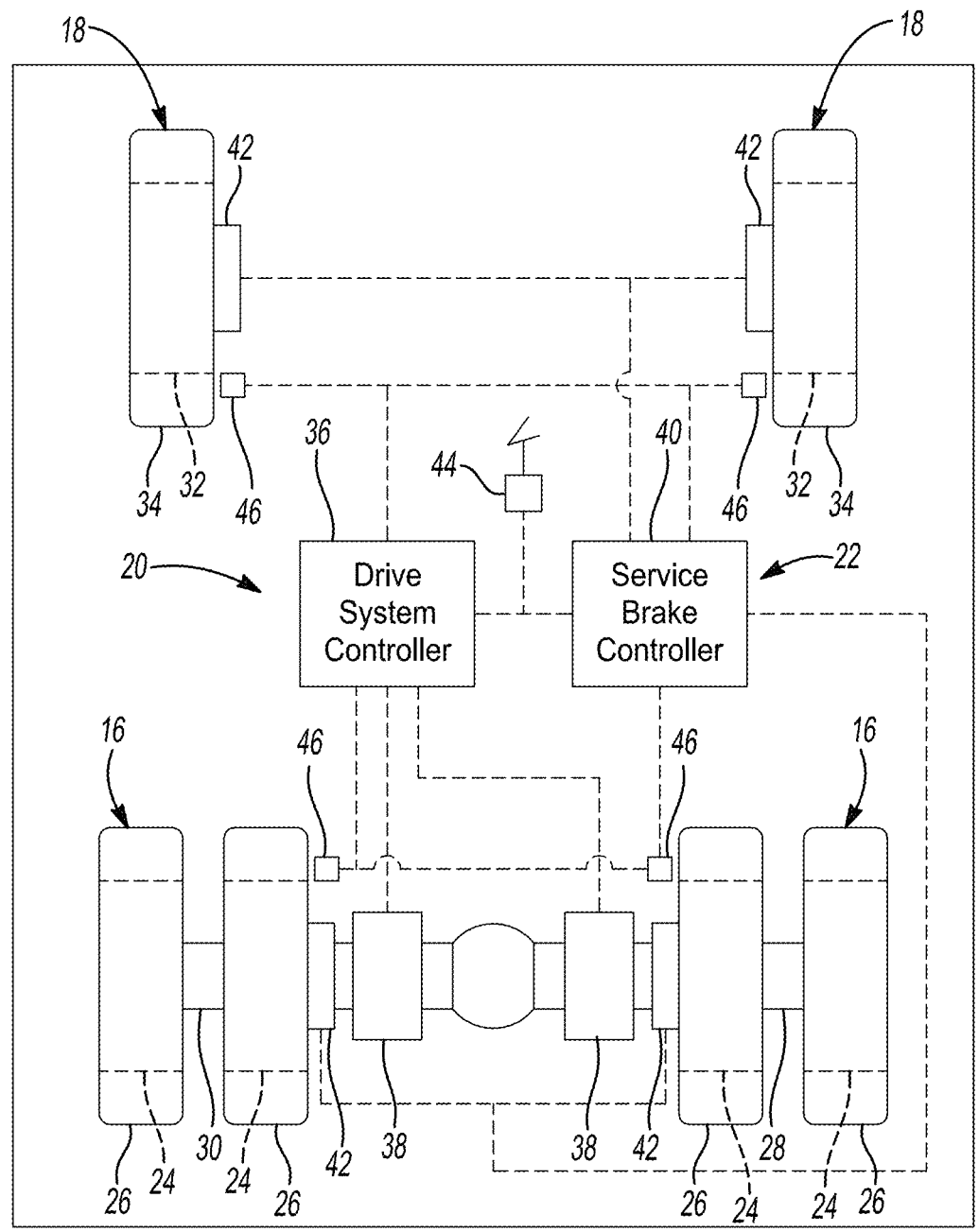
FIG. 2 is a schematic overhead view of the vehicle of FIG. 1.

With reference to FIGS. 1 and 2, a heavy-duty vehicle 10 is provided. For example, the vehicle 10 may be an off-highway dump truck or an articulated dump truck for various heavy-duty applications such as excavation, construction, and/or mining. The vehicle 10 may include a vehicle frame or chassis 12, a dump body 14, a plurality of rear-wheel assemblies 16, a plurality of front-wheel assemblies 18, a drive system 20, and a service brake system 22. The dump body 14 is supported on the vehicle frame 12 and may be rotatable relative to the vehicle frame 12 about a pivot 21 disposed at or near a rear end of the vehicle frame 12. A hydraulic hoist system can be actuated to rotate the dump body 14 relative to the vehicle frame 12 between a load position (shown in FIG. 1) and an unload (or dump) position.

The rear-wheel assemblies 16 and the front-wheel assemblies 18 support the vehicle frame 12. The rear-wheel assemblies 16 can be propelled and braked by the drive system 20. In the example vehicle 10 shown in FIGS. 1 and 2, each of the rear-wheel assemblies 16 includes a pair of rims 24 and a pair of tires 26 mounted on respective rims 24.

As shown in FIG. 2, the rims 24 of a first one of the rear-wheel assemblies 16 can be rotatably mounted on a first spindle 28, and the rims 24 of a second one of the rear-wheel assemblies 16 can be rotatably mounted on a second spindle 30. In this manner, the four rims 24 and tires 26 of the two rear-wheel assemblies 16 may be arranged in an in-line configuration (i.e., with the two rims 24 and tires 26 of one rear-wheel assembly 16 disposed on one lateral side of the vehicle frame 12 and the two rims 24 and tires 26 of the other rear-wheel assembly 16 disposed on the other lateral side of the vehicle frame 12). Each of the front-wheel assemblies 18 includes a rim 32 and a tire 34.

The drive system 20 may include a drive system controller or control module 36 and a plurality of electric drive motors 38. The drive system 20 may be a diesel-electric drive system including a diesel engine (not shown) that generates electrical energy that powers the electric drive motors 38. The electric drive motors 38 could be induction traction motors, for example. Each of the electric drive motors 38 is coupled to a respective one of the rear-wheel assemblies 16 and is configured to propel and retard the respective rear-wheel assembly 16. The electric drive motors 38 are operable independently of each other. Operation of the electric drive motors 38 is controlled by the drive system controller 36 based on input from the operator of the vehicle 10 and detected traction conditions. For example, when the operator applies an accelerator pedal (not shown), the drive system controller 36 can increase the amount of torque that the drive motors 38 transmit to the rear-wheel assemblies 16. When the drive applies a brake pedal 44, a braking signal is transmitted to the drive system controller 36, and the drive system controller 36 can cause the drive motors 38 to apply retarding torque to the rear-wheel assemblies 16 to slow the vehicle 10. As will be described in more detail below, the drive system controller 36 can selectively modulate the retarding torque based on signals received from the service brake system 22 and detected tire-to-ground traction conditions to reduce or prevent lockup of the rear-wheel assemblies 16 during a braking event. The application of retarding torque by the drive system 20 is referred to as "dynamic braking."

In the example vehicle 10 shown in the figures, only the rear-wheel assemblies are driven by the electric motors 38. However, in some configurations of the vehicle 10, the drive system 20 could include additional electric motors configured to propel and retard the front-wheel assemblies 18.

The service brake system 22 may include a service brake controller or control module 40 and a plurality of service brakes 42. The service brake controller 40 is in communication with the drive system controller 36 and the service brakes 42. The service brakes 42 may be oil-cooled, hydraulically actuated, multiple-disc brakes, for example. The service brakes 42 may be mounted on each of the rear-wheel and front-wheel assemblies 16, 18. The service brake controller 40 is configured to control each of the service brakes 42. That is, the service brake controller 40 can selectively apply and modulate the service brakes 42 based on input from the operator of the vehicle 10 (e.g., in response to the operator applying sufficient pressure to the brake pedal 44 to transmit a braking signal to the service brake controller 40) and detected tire-to-ground traction conditions. The service brake system 22 includes an antilock braking system that modulates the service brakes 42 by modulating valves (e.g., PPC (proportional pressure control) and cut valves) that control flows of hydraulic fluid that actuate the service brakes 42.

A wheel-speed sensor 46 may be mounted on or near each of the rear-wheel and front-wheel assemblies 16, 18. The wheel-speed sensors 46 can be Hall Effect sensors, magnetoresistive sensors, or variable-reluctance sensors, for example, or any type of sensor configured to measure rotational speed of the respective wheel assemblies 16, 18 (i.e., the wheel-speed sensors 46 can measure the individual speeds of each of the front-left wheel assembly 18, front-right wheel assembly 18, rear-left wheel assembly 16, and rear-right wheel assembly 16, respectively). The wheel-speed sensors 46 are in communication with the drive system controller 36 and the service brake controller 40. The drive system controller 36 and/or the service brake controller 40 can determine whether any of the wheel assemblies 16, 18 are locking up or slipping during a braking event based on data from the wheel-speed sensors 46 and/or data from gyroscopic sensors (not shown) and/or accelerometers (not shown) mounted on the vehicle 10.

The brake pedal 44 may be located within the cab of the vehicle 10 and may be a combination brake pedal. That is, when the operator of the vehicle 10 depresses the brake pedal 44 up to a first distance (for example, the first distance could be the first 70% of the range of motion of the brake pedal 44), only the drive system 20 will apply retarding torque to slow the vehicle. If the operator of the vehicle 10 depresses the brake pedal 44 further than the first distance (e.g., more than 70% of the range of motion of the brake pedal 44), the service brake controller 40 will actuate the service brakes 42 to provide supplemental braking force. In some configurations of the vehicle 10, the combination brake pedal 44 can be replaced with two separate brake pedals—i.e., a brake pedal that controls the service brakes 42 and another brake pedal that controls the dynamic braking of the drive system 20). In some configurations, the vehicle 10 may not include any brake pedals. Instead, one or more braking signal may be transmitted to controllers 36, 40 from one or more hand-operated levers, buttons, or joysticks, for example, or the one or more braking signals may be generated by an autonomous driving system.

When the operator of the vehicle 10 depresses the brake pedal 44 a sufficient distance to actuate the service brakes 42 (i.e., when the brake pedal 44 is depressed more than the first distance), an antilock braking method is applied that slows the vehicle 10 in a manner that shortens a stopping distance and reduces or prevents the wheel assemblies 16, 18 from locking up or slipping. In the antilock braking method, the drive system controller 36 may control the dynamic braking of the drive system 20 according to a dynamic brake process 100 and the service brake controller 40 may control the service brakes 42 according to a service brake process 200. The processes 100, 200 work in parallel with each other to slow the vehicle 10 in as short of a stopping distance as possible while preventing the wheel assemblies 16, 18 from locking up and slipping. The processes 100, 200 may be reassessed or repeated multiple times (e.g., at each time step of the controllers 36, 40) such that the control state may change several times during a single braking event.

Figure 3:
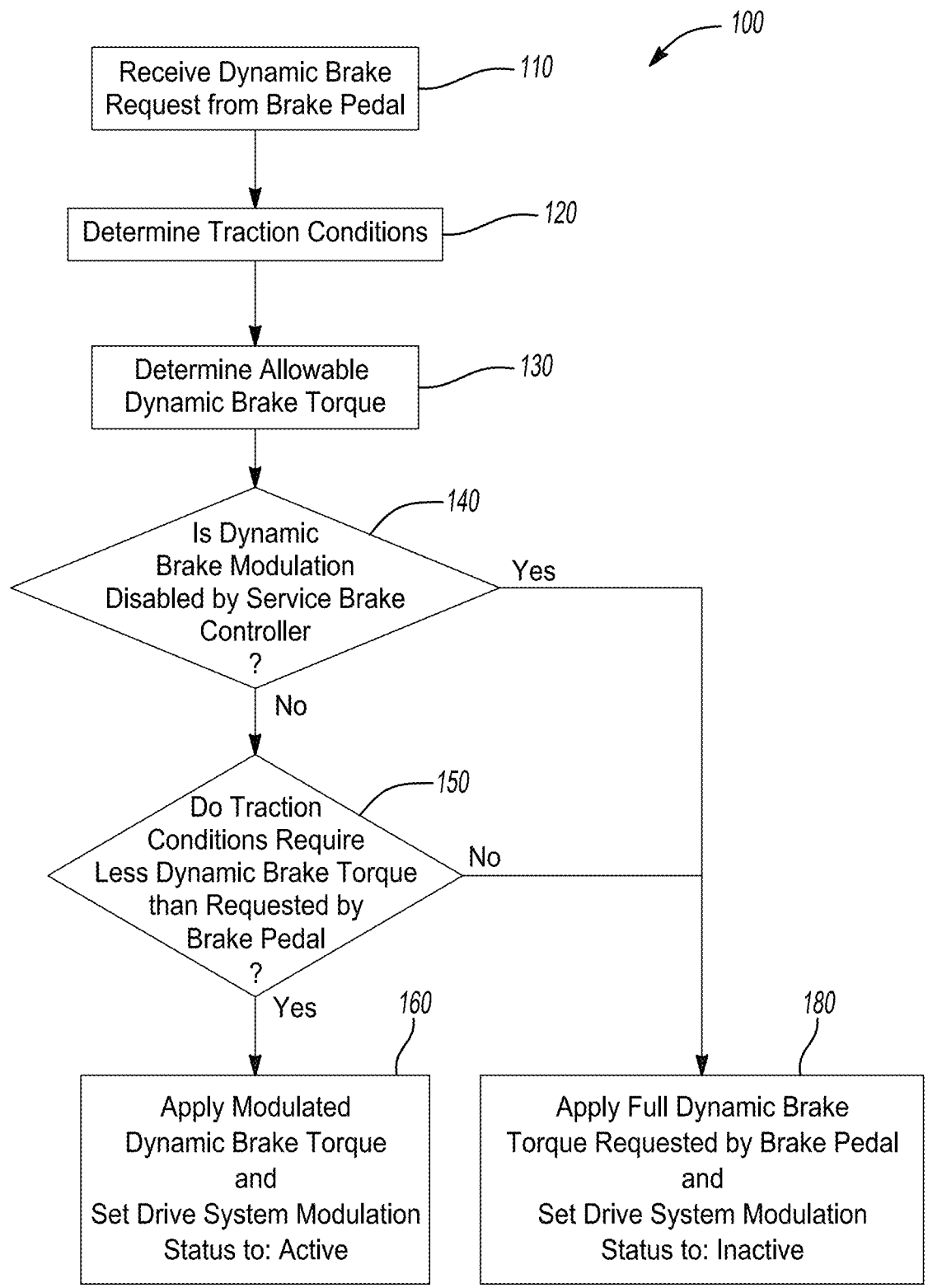
FIG. 3 is a flowchart depicting a process of controlling a dynamic brake system of the vehicle.

Referring now to FIG. 3, the dynamic brake process 100 executed by the drive system controller 36 will be described. At step 110, the drive system controller 36 receives a dynamic brake request signal from the brake pedal 44 (i.e., in response to the brake pedal 44 being actuated by the operator of the vehicle 10). Then, at step 120, the drive system controller 36 assesses the tire-to-ground traction conditions. As described above, the drive system controller 36 can determine which (if any) of the rear-left wheel assembly 16, rear-right wheel assembly 16, front-left wheel assembly 18, and/or front-right wheel assembly 18 are locking up or slipping during a braking event based on data from the wheel-speed sensors 46 and/or data from gyroscopic sensors and/or accelerometers mounted on the vehicle 10. The drive system controller 36 can calculate the tire-to-ground traction of each of the wheel assemblies 16, 18 based on that sensor data.

At step 130, the drive system controller 36 can determine a maximum allowable amount of dynamic brake torque that the drive system 20 can apply to the rear-wheel assemblies 16 based on the tire-to-ground traction determined at step 120.

At step 140, the drive system controller 36 determines whether a disable command from the service brake controller 40 is active or inactive. The disable command is a signal from the service brake controller 40 that tells the drive system controller 36 to disable modulation of dynamic brake torque applied by the electric motors 38 of the drive system 20. That is, when the disable command is active (i.e., when the answer to the question at step 140 is "Yes"), the drive system controller 36 is unable to modulate dynamic brake torque, but unmodulated dynamic brake torque can still be applied. When the disable command is deactivated (i.e., when the answer to the question at step 140 is "No"), the drive system controller 36 is able to apply either modulated or unmodulated dynamic brake torque.

If, at step 140, the drive system controller 36 determines that the disable command from the service brake controller 40 is deactivated (i.e., when the answer to the question at step 140 is "No"), the drive system controller 36 determines, at step 150, whether tire-to-ground traction conditions demand less dynamic brake torque than an amount of dynamic brake torque requested by the brake pedal 44. That is, the drive system controller 36 determines whether the maximum allowable amount of dynamic brake torque determined at step 130 is less than the amount of dynamic brake torque requested by the operator's actuation of the brake pedal 44.

If, at step 150, the drive system controller 36 determines that the traction conditions demand less dynamic brake torque than the requested amount of dynamic brake torque (i.e., when the answer to the question at step 150 is "Yes"), the drive system controller 36 can (at step 160) cause the electric motors 38 to apply modulated dynamic brake torque (e.g., a modulated dynamic brake torque less than or equal to the maximum allowable dynamic brake torque determined at step 130) and set a drive system modulation status to "active" (which indicates that the drive system 20 is applying modulated dynamic brake torque). As will be described below, the drive system modulation status is communicated to the service brake controller 40 and is referenced in the service brake process 200 (FIG. 4).

If, at step 140, the drive system controller 36 determines that the disable command from the service brake controller 40 is active (i.e., when the answer to the question at step 140 is "Yes"), the drive system controller 36 will skip steps 150 and 160. Instead, the drive system controller 36 will (at step 180) apply the full, unmodulated dynamic brake torque requested by the brake pedal 44 and set the drive system modulation status to "inactive." Furthermore, if the drive system controller 36 determines at step 150 that tire-to-ground traction conditions do not demand less dynamic brake torque than an amount of dynamic brake torque requested by the brake pedal 44 (i.e., when the answer to the question at step 150 is "No"), the drive system controller 36 will skip step 160 and will execute step 180 as described above. That is, the drive system controller 36 will (at step 180) apply the full, unmodulated dynamic brake torque requested by the brake pedal 44 and set the drive system modulation status to "inactive" (which indicates that the drive system 20 is applying unmodulated dynamic brake torque).

Referring now to FIG. 4, the service brake process 200 executed by the service brake controller 40 will be described. At step 210, the service brake controller 40 receives a service brake request signal from the brake pedal 44 (i.e., in response to the operator depressing the brake pedal 44 a sufficient distance to actuate the service brakes 42). Then, at step 220, the service brake controller 40 assesses the tire-to-ground traction conditions (or receives the tractions conditions from the drive system controller 36). As described above, the controller 36 and/or controller 40 can determine which (if any) of the wheel assemblies 16, 18 are locking up or slipping during a braking event based on data from the wheel-speed sensors 46 and data from gyroscopic sensors and/or accelerometers mounted on the vehicle 10. The controller 36, 40 can calculate the tire-to-ground traction of each of the wheel assemblies 16, 18 based on that sensor data.

At step 230, the service brake controller 40 can determine a maximum allowable amount of service brake torque that the service brake system 22 can apply to the rear-wheel assemblies 16 based on the tire-to-ground traction determined at step 220. After the service brake controller 40 judges the severity of the slip or lockup (established by exceeding a wheel rotational deceleration limit at initial application of the service brakes 42), the maximum allowable service brake torque can be calculated based on the maximum coefficient of friction calculated during the initial wheel deceleration and then is modulated as required based on each wheel speed as a percentage of actual vehicle speed.

At step 240, the service brake controller 40 determines whether tire-to-ground traction conditions demand less service brake torque than an amount of service brake torque requested by the brake pedal 44. That is, the service brake controller 40 determines whether the maximum allowable amount of service brake torque determined at step 230 is less than the amount of service brake torque requested by the operator's actuation of the brake pedal 44.

If, at step 240, the service brake controller 40 determines that the traction conditions demand less service brake torque than the requested amount of service brake torque (i.e., when the answer to the question at step 240 is "Yes"), the service brake controller 40 determines (at step 250) whether the maximum amount of allowable service brake torque determined at step 230 is below a predetermined minimum service brake torque (the predetermined minimum service brake torque could be greater than or equal to zero). If the maximum amount of allowable service brake torque is below the predetermined minimum (i.e., when the answer to the question at step 250 is "Yes"), the service brake controller 40 will determine (at step 255) if the drive system modulation status is active. As described above, the drive system modulation status is communicated to the service brake controller 40 from the drive system controller 36. If, at step 255, the service brake controller 40 determines that the drive system modulation status is active (i.e., when the answer to the question at step 255 is "Yes"), the service brake controller 40 will (at step 260) cause the service brakes 42 to apply unmodulated service brake torque and hold the service brake torque at the predetermined minimum torque. Then, at step 265, the service brake controller 40 will enable modulation of dynamic brake torque by deactivating the disable command. Deactivating the disable command allows the drive system controller 36 to apply either modulated or unmodulated dynamic brake torque according to the process 100 show in FIG. 3 and described above. That is, deactivating the disable command allows the drive system controller 36 to decide (according to process 100) if dynamic braking should be modulated or unmodulated.

If either: (a) the service brake controller 40 determines (at step 250) that the maximum amount of allowable service brake torque is above the predetermined minimum (i.e., when the answer to the question at step 250 is "No"), or (b) the service brake controller 40 determines (at step 255) that the drive system modulation status is inactive (i.e., when the answer to the question at step 255 is "No"), then the service brake controller 40 will (at step 270) cause the service brakes 42 to apply modulated service brake torque. Then, at step 275, the service brake controller 40 will disable modulation of dynamic brake torque by activating the disable command. Activating the disable command prevents the drive system controller 36 from modulating the dynamic brake torque but still allows unmodulated dynamic brake torque.

If, at step 240, the service brake controller 40 determines that traction conditions do not demand less service brake torque than the requested amount of service brake torque (i.e., when the answer to the question at step 240 is "No"), the service brake controller 40 will (at step 280) cause the service brakes 42 to apply unmodulated service brake torque at the full amount requested by the brake pedal 44. Then, at step 285, the service brake controller 40 will enable modulation of dynamic brake torque by deactivating the disable command (if the disable command was previously activate) or by maintaining the disable command in the deactivated state (if the disable command was already deactivated). It should be appreciated that by enabling modulation of the dynamic brake torque at step 285, the service brake controller 40 is not necessarily forcing modulation of the dynamic brake torque. Rather, by enabling modulation of the dynamic brake torque at step 285, the service brake controller 40 is merely allowing the drive system controller 36 to decide whether to apply modulated or unmodulated dynamic brake torque according to the process 100.

The dynamic brake process 100 and the service brake process 200 may loop continuously during a braking event as long as the brake pedal 44 is actuated.

Figure 5A:
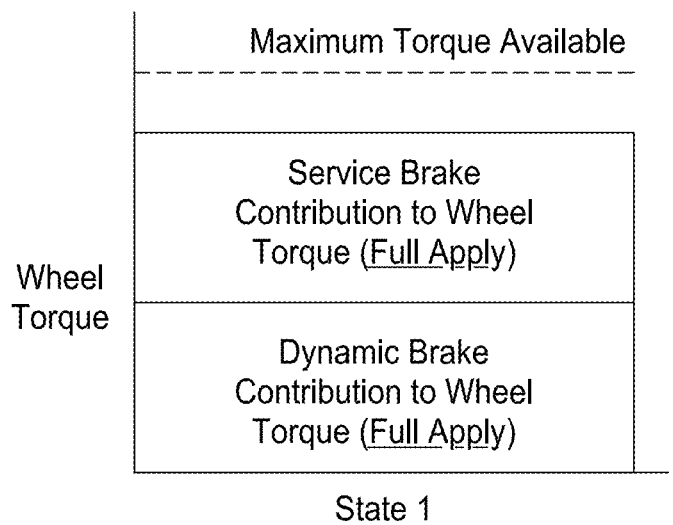
FIG. 5A is a graphical depiction of the braking torque applied during a first traction state.
Figure 5B:
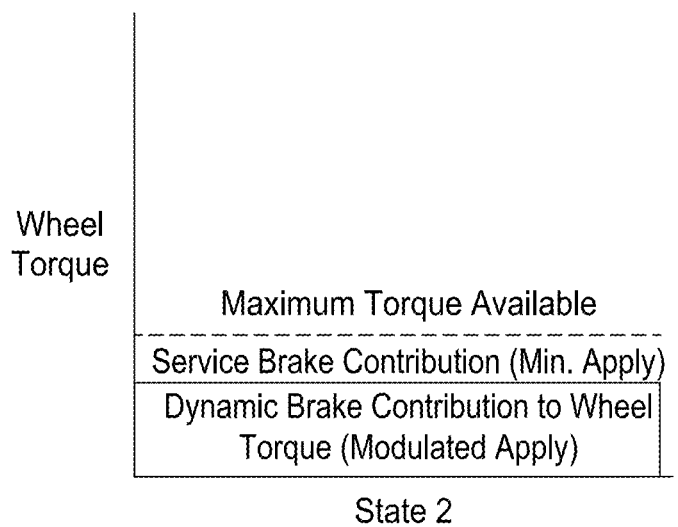
FIG. 5B is a graphical depiction of the braking torque applied during a second traction state.
Figure 5C:
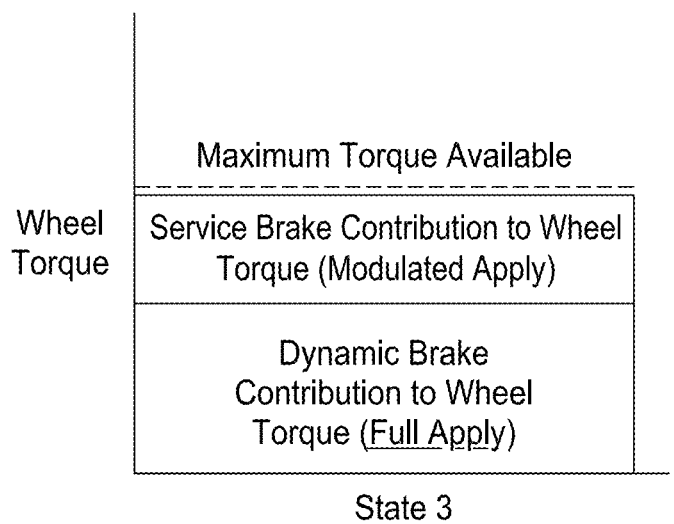
FIG. 5C is a graphical depiction of the braking torque applied during a third traction state.

FIGS. 5A-5C show contributions of service brake torque and dynamic brake torque in three different states during a braking event. FIG. 5A depicts State 1, in which unmodulated service brake torque and unmodulated dynamic brake torque are both applied at the full braking torque amounts that are requested by the brake pedal 44. In State 1, the maximum braking torque available (i.e., the maximum amount of braking torque that tire-to-ground traction conditions will allow without lockup or slipping) is greater than the sum of the full, unmodulated service brake torque and the full, unmodulated dynamic brake torque. State 1 corresponds to step 180 (i.e., when the answer to the question at step 140 is "Yes" or when the answers to the questions at steps 140 and 150 are both "No") of the dynamic brake process 100 (FIG. 3) and step 280 (i.e., when the answer to the question at step 240 is "No") of the service brake process 200 (FIG. 4).

FIG. 5B depicts State 2, in which the maximum braking torque available (i.e., the maximum amount of braking torque that tire-to-ground traction conditions will allow without lockup or slipping) is lower than in State 1 and allows for only the predetermined minimum service brake torque and modulated dynamic brake torque. State 2 corresponds to step 160 (i.e., when the answer to the question at step 140 is "No" and the answer to the question at step 150 is "Yes") of the dynamic brake process 100 (FIG. 3) and step 260 (i.e., when the answers to the questions at steps 240, 250, and 255 are all "Yes") of the service brake process 200 (FIG. 4).

FIG. 5C depicts State 3 in which the maximum braking torque available (i.e., the maximum amount of braking torque that tire-to-ground traction conditions will allow without lockup or slipping) is lower than in State 1 and greater than State 2. In State 2, the traction conditions allow for full, unmodulated dynamic brake torque and modulated service brake torque. State 3 corresponds to step 180 (i.e., when the answer to the question at step 140 is "Yes" or when the answers to the questions at steps 140 and 150 are both "No") of the dynamic brake process 100 (FIG. 3) and step 270 (i.e., when the answer to the question at step 240 is "Yes" and the answer to the question at either of steps 250 and 255 are "No") of the service brake process 200 (FIG. 4).

The following is an example application of the antilock braking method during an example braking event. When there is no wheel slip when the operator applies the brake pedal 44 (i.e., there is no difference between vehicle speed and wheel speed), then the state should be State 1, and the controllers 36, 40 apply full dynamic brake torque and full service brake torque. When there is relatively low wheel slip while braking (i.e., when the difference between vehicle speed and wheel speed is relatively small), then state transitions to State 3, and the controllers 36, 40 apply full dynamic brake torque and modulated service brake torque. When there is relatively high wheel slip (i.e., when the difference between vehicle speed and wheel speed is relatively large), the state transitions to State 2, and the controllers 36, 40 apply modulated dynamic brake torque and minimum service brake torque. Then, if the wheel slip decreases to a relatively low amount of slip (i.e., the difference between vehicle speed and wheel speed is relatively small) again, the state transitions to State 3. Before the vehicle 10 stops completely, if there is no slip (i.e., if the difference between vehicle speed and wheel speed is zero) again, the state transitions to State 1.

Applying service brake torque to any given wheel while simultaneously modulating dynamic brake torque to the same wheel is undesirable and can reduce overall braking performance. The antilock braking method using the processes 100, 200 described above allows only one system (either the drive system 20 or the service brake system 22) to modulate brake torque to a given wheel at any given time. This allows for improved slip control and antilock control with only limited coordination between the controllers 36, 40. Furthermore, by giving priority for modulation to the service brakes 42 (i.e., by disabling modulation of dynamic brake torque when the service brake torque is being modulated) can reduce wear of the service brakes 42.

In some configurations of the antilock braking method of the present disclosure, the service brake controller 40 may disable the service brake 42 at a given wheel if the drive system 20 is already modulating or reducing dynamic brake torque at the given wheel. This methodology may be applicable in circumstances where dynamic brake torque is applied before the service brakes are applied. For example, in a situation where the brake pedal 44 was initially depressed only far enough to apply the dynamic brakes and the drive system 20 is already modulating the dynamic brake torque when the brake pedal 44 was depressed far enough to actuate the service brakes, the service brake controller 40 may disable the service brakes.

It should be appreciated that the drive system controller 36 and service brake controller 40 could be physically separate controllers in signal communication with each other, or the drive system controller 36 and service brake controller 40 could be parts of a single physical controller. In some configurations, a single controller can control the motors 38 and service brakes 42 and can execute the processes 100, 200 as describe above. In some configurations, a single controller can control the motors 38 and service brakes 42 and can execute a process that is a combination of the processes 100, 200.

In some configurations of the vehicle 10, the service brakes 42 of the front wheel assemblies 18 could be controlled in a manner that differs from the control of the service brakes 42 of the rear wheel assemblies 16 described above (e.g., in configurations where the vehicle 10 does not have dynamic braking for the front wheel assemblies 18). In configurations where the vehicle 10 is equipped with dynamic braking for the front wheel assemblies 18, the processes 100, 200 described above can be applied to control dynamic braking and/or service braking of the front wheel assemblies 18.

While the service brake controller 40 is described above as being configured to selectively disable modulation of dynamic brake torque, in some configurations of the vehicle 10, the drive system controller 36 may be configured to selectively disable modulation of service brake torque.

In this application, including the definitions below, the term "control module" or the term "controller" may be replaced with the term "circuit." The term "control module" or the term "controller" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The control module or controller may include one or more interface circuits. In some examples, the interface circuits may include wired or wireless interfaces that are connected to a local area network (LAN), the Internet, a wide area network (WAN), or combinations thereof. The functionality of any given control module or controller of the present disclosure may be distributed among multiple control modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A heavy-duty vehicle comprising:
a chassis;

a wheel supporting the chassis;
a drive system including a motor associated with the wheel, wherein the motor is configured to propel the wheel and to apply a dynamic brake torque to the wheel;
a service brake associated with the wheel and configured to apply a service brake torque to the wheel;
a drive system controller configured to control operation of the motor, wherein the drive system controller selectively causes the motor to apply modulated dynamic brake torque to the wheel based on traction conditions, and wherein the drive system controller selectively causes the motor to apply unmodulated dynamic brake torque to the wheel based on traction conditions; and
a service brake controller configured to control operation of the service brake,
wherein the service brake controller selectively causes the service brake to apply modulated service brake torque to the wheel based on the traction conditions, and wherein the service brake controller selectively causes the service brake to apply unmodulated service brake torque to the wheel based on the traction conditions, and
wherein while the service brake applies modulated service brake torque, modulated dynamic brake torque is disabled and unmodulated dynamic brake torque is allowed.

2. The heavy-duty vehicle of claim 1, wherein the service brake controller determines an allowable service brake torque based on traction conditions, and wherein the service brake controller is configured to hold the service brake torque at a predetermined minimum service brake torque when the allowable service brake torque is less than the predetermined minimum service brake torque.

3. The heavy-duty vehicle of claim 2, wherein application of the modulated dynamic brake torque is allowed while the service brake torque is held at the predetermined minimum service brake torque.

4. The heavy-duty vehicle of claim 1, wherein the service brake controller determines an allowable service brake torque based on traction conditions, and wherein the service brake controller is configured to cause the service brake to apply modulated service brake torque when: (a) the allowable service brake torque is less than a service brake torque requested by a brake signal, and (b) the allowable service brake torque is greater than a predetermined minimum service brake torque.

5. The heavy-duty vehicle of claim 4, wherein the service brake controller communicates a disable command to the drive system controller to disable application of the modulated dynamic brake torque during application of the modulated service brake torque.

6. The heavy-duty vehicle of claim 1, wherein:
the service brake and the motor of the drive system are operable in a first state, a second state, and a third state,
in the first state, the service brake controller and the drive system controller apply unmodulated service brake torque and unmodulated dynamic brake torque when traction conditions do not require less brake torque than an amount of brake torque requested by a brake signal,
in the second state, the service brake controller holds the service brake torque at a predetermined minimum service brake torque and the drive system controller applies modulated dynamic brake torque, and
in the third state, the service brake controller applies modulated service brake torque and the drive system controller applies unmodulated dynamic brake torque.

7. The heavy-duty vehicle of claim 1, further comprising:
an additional wheel supporting the chassis; and
an additional service brake associated with the additional wheel and configured to apply a service brake torque to the additional wheel,
wherein the drive system includes an additional motor associated with the additional wheel,
wherein the additional motor is configured to propel the additional wheel and to apply a dynamic brake torque to the additional wheel,
wherein the service brakes are operable independently of each other, and
wherein the motors are operable independently of each other.

8. A method of braking a heavy-duty vehicle comprising:
receiving a brake request;
determining traction conditions between a wheel of the vehicle and a ground surface;
determining an allowable brake torque based on the traction conditions;
applying dynamic brake torque to the wheel using a motor of a drive system of the vehicle, wherein the motor is operable to propel the vehicle and is operable to brake the vehicle;
applying a service brake torque to the wheel using a service brake, wherein the service brake is operable independently of the motor;
selectively switching the dynamic brake torque between modulated and unmodulated dynamic brake torque;
selectively switching the service brake torque between modulated and unmodulated service brake torque; and
prioritizing the modulation to the service brake torque over the modulation of dynamic brake torque based on the traction conditions.

9. The method of claim 8, wherein prioritizing the modulation to the service brake torque includes: allowing unmodulated dynamic brake torque to the wheel and disabling modulated dynamic brake torque to the wheel while modulated service brake torque is applied to the wheel.

10. The method of claim 9, further comprising:
determining an allowable service brake torque based on the traction conditions; and
holding the service brake torque at a predetermined minimum service brake torque in when the allowable service brake torque is less than the predetermined minimum service brake torque.

11. The method of claim 10, further comprising modulating dynamic brake torque while the service brake torque is held at the unmodulated predetermined minimum service brake torque.

12. The method of claim 8, further comprising:
determining an allowable service brake torque based on the traction conditions; and
modulating the service brake torque when: (a) the allowable service brake torque is less than a service brake torque requested, and (b) the allowable service brake torque is greater than a predetermined minimum service brake torque.

13. The method of claim 8, wherein:
the service brake and the motor of the drive system are operable in a first state, a second state, and a third state,
in the first state, unmodulated service brake torque and unmodulated dynamic brake torque are applied when traction conditions do not require less brake torque than an amount of brake torque requested, in the second state, the service brake torque is held at a predetermined minimum service brake torque and the dynamic brake torque is modulated, and in the third state, service brake torque is modulated and dynamic brake torque is unmodulated.

14. The method of claim 8, wherein the vehicle further comprises:
an additional wheel;
an additional service brake associated with the additional wheel and configured to apply a service brake torque to the additional wheel; and
an additional motor associated with the additional wheel,
wherein the additional motor is configured to propel the additional wheel and to apply a dynamic brake torque to the additional wheel,
wherein the service brakes are operable independently of each other, and
wherein the motors are operable independently of each other.

15. A heavy-duty vehicle comprising:
a chassis;
a wheel supporting the chassis;
a motor associated with the wheel, wherein the motor is configured to propel the wheel and to apply a dynamic brake torque to the wheel;
a service brake associated with the wheel and configured to apply a service brake torque to the wheel; and
a controller configured to control operation of the motor and operation of the service brake,
wherein, in response to receipt of one or more braking signals, the controller is configured to selectively cause the motor to apply modulated dynamic brake torque to the wheel, and wherein the controller is configured to selectively cause the motor to apply unmodulated dynamic brake torque to the wheel,
wherein, in response to receipt of one or more braking signals, the controller selectively causes the motor to apply modulated dynamic brake torque to the wheel based on traction conditions and selectively causes the motor to apply unmodulated dynamic brake torque to the wheel based on the traction conditions,
wherein, in response to receipt of the one or more braking signals, the controller selectively causes the service brake to apply modulated service brake torque to the wheel based on the traction conditions, and wherein the service brake controller selectively causes the service brake to apply unmodulated service brake torque to the wheel based on the traction conditions, and
wherein the controller prioritizes application of the modulated service brake torque over application of the modulated dynamic brake torque based on the traction conditions, and
wherein prioritizing application of the modulated service brake torque includes: allowing unmodulated dynamic brake torque to the wheel and disabling modulated dynamic brake torque to the wheel while modulated service brake torque is applied to the wheel.

16. The heavy-duty vehicle of claim 15, wherein the controller determines an allowable service brake torque based on traction conditions, and wherein the controller is configured to hold the service brake torque at a predetermined minimum service brake torque when the allowable service brake torque is less than the predetermined minimum service brake torque.

17. The heavy-duty vehicle of claim 16, wherein application of the modulated dynamic brake torque is allowed while the service brake torque is held at the predetermined minimum service brake torque.

18. The heavy-duty vehicle of claim 15, wherein the controller determines an allowable service brake torque based on traction conditions, and wherein the controller is configured to cause the service brake to apply modulated service brake torque when: (a) the allowable service brake torque is less than a service brake torque requested by a brake signal, and (b) the allowable service brake torque is greater than the predetermined minimum service brake torque.

19. The heavy-duty vehicle of claim 15, wherein:
the service brake and the motor are operable in a first state, a second state, and a third state,
in the first state, the controller applies unmodulated service brake torque and unmodulated dynamic brake torque when traction conditions do not require less brake torque than an amount of brake torque requested by a brake pedal,
in the second state, the controller holds the service brake torque at a predetermined minimum service brake torque and applies modulated dynamic brake torque, and
in the third state, the controller applies modulated service brake torque and applies unmodulated dynamic brake torque.

* * * * *